(12) United States Patent  
Tatina

(10) Patent No.: US 7,121,777 B2  
(45) Date of Patent: Oct. 17, 2006

(54) CONTAINER BRIDGING STABILIZER

(75) Inventor: Richard A. Tatina, Countryside, IL (US)

(73) Assignee: Portec Rail Products, Inc., Pittsburgh, PA (US)

( * ) Notice: Subject to any disclaimer, the term of this patent is extended or adjusted under 35 U.S.C. 154(b) by 365 days.

(21) Appl. No.: 10/664,482

(22) Filed: Sep. 17, 2003

(65) Prior Publication Data

US 2005/0056644 A1   Mar. 17, 2005

(51) Int. Cl.  
*B60P 7/08* (2006.01)

(52) U.S. Cl. .............................. 410/68; 410/76; 410/82

(58) Field of Classification Search ............... 410/35, 410/46, 68, 71, 76, 79, 82; 24/287; 414/802, 414/788.1, 788.9, 791.6  
See application file for complete search history.

(56) References Cited

U.S. PATENT DOCUMENTS 3,722,714 A * 3/1973 Morris et al. ................. 410/85
4,277,212 A * 7/1981 Rosaia ......................... 410/78
5,183,375 A * 2/1993 Fenton et al. ................ 410/35
6,877,939 B1 * 4/2005 Tomkins et al. .............. 410/46

OTHER PUBLICATIONS

Semi-Automatic Twist Lock CV-12—Conver OSR Company—1988.

* cited by examiner

*Primary Examiner*—Stephen Gordon  
(74) *Attorney, Agent, or Firm*—Schiff Hardin LLP

(57) ABSTRACT

In a system and method for stabilizing a first stack of upper and lower shipping containers with respect to a second stack of upper and lower shipping containers, inter-box connectors are provided for connecting the upper and lower containers of each stack. A container bridging stabilizer is provided which surrounds two of the adjacent inter-box connectors where the two lower containers are laterally adjacent each other to laterally link the inter-box connectors and their respective lower containers together. The container bridging stabilizer laterally stabilizes the first and second stacks with respect to each other.

10 Claims, 5 Drawing Sheets

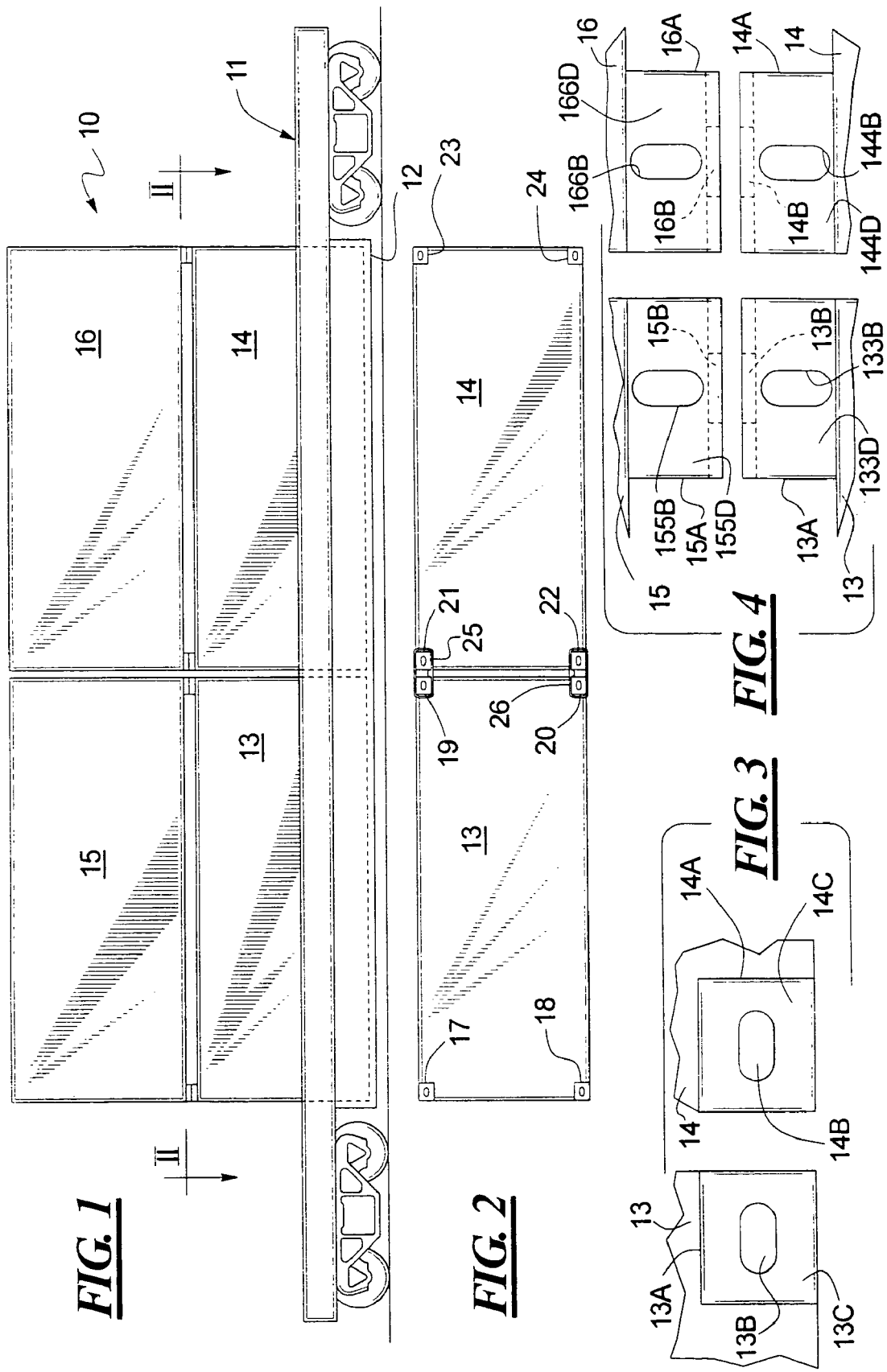

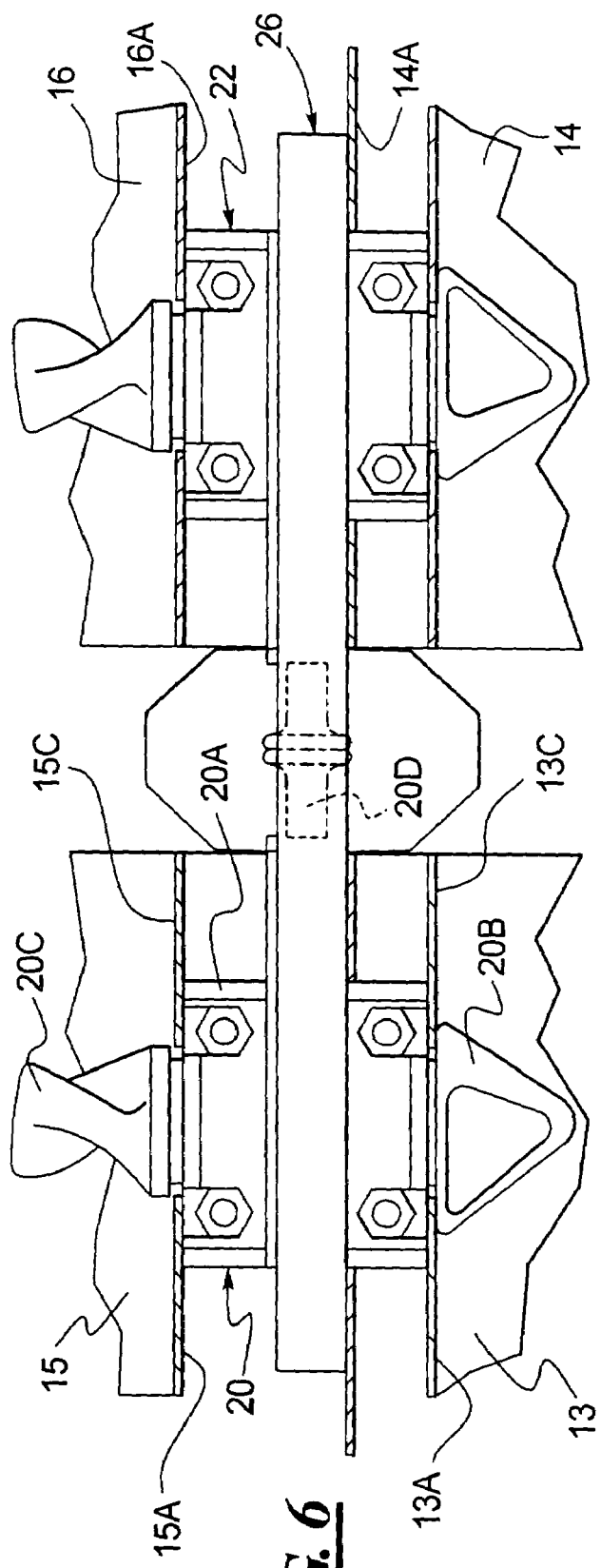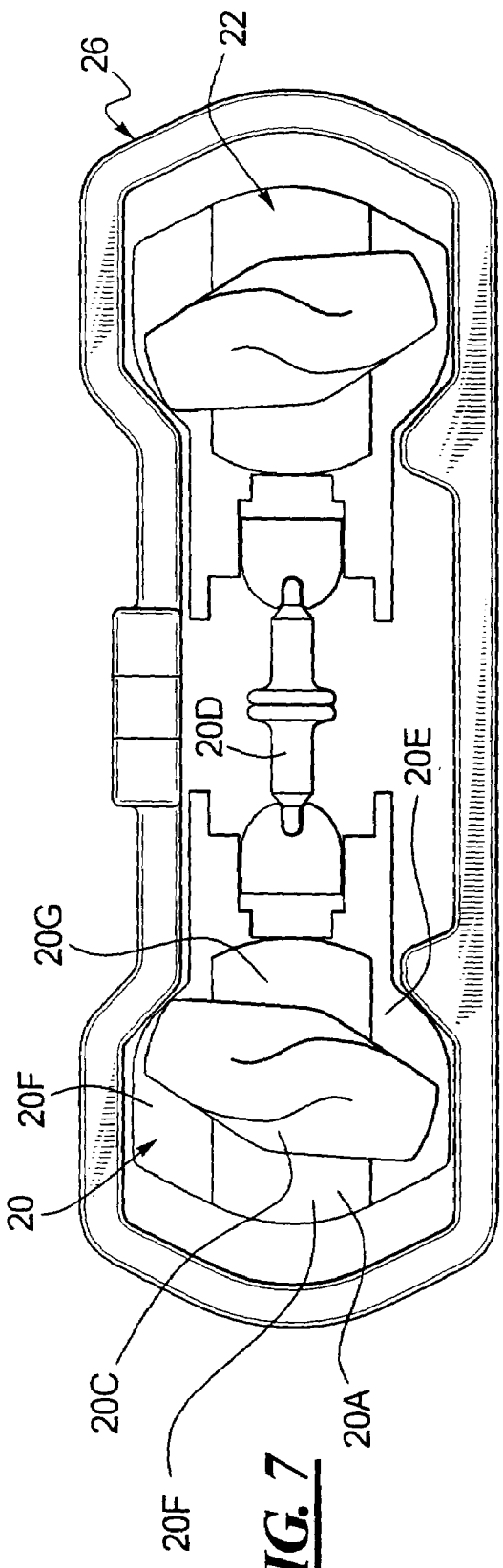

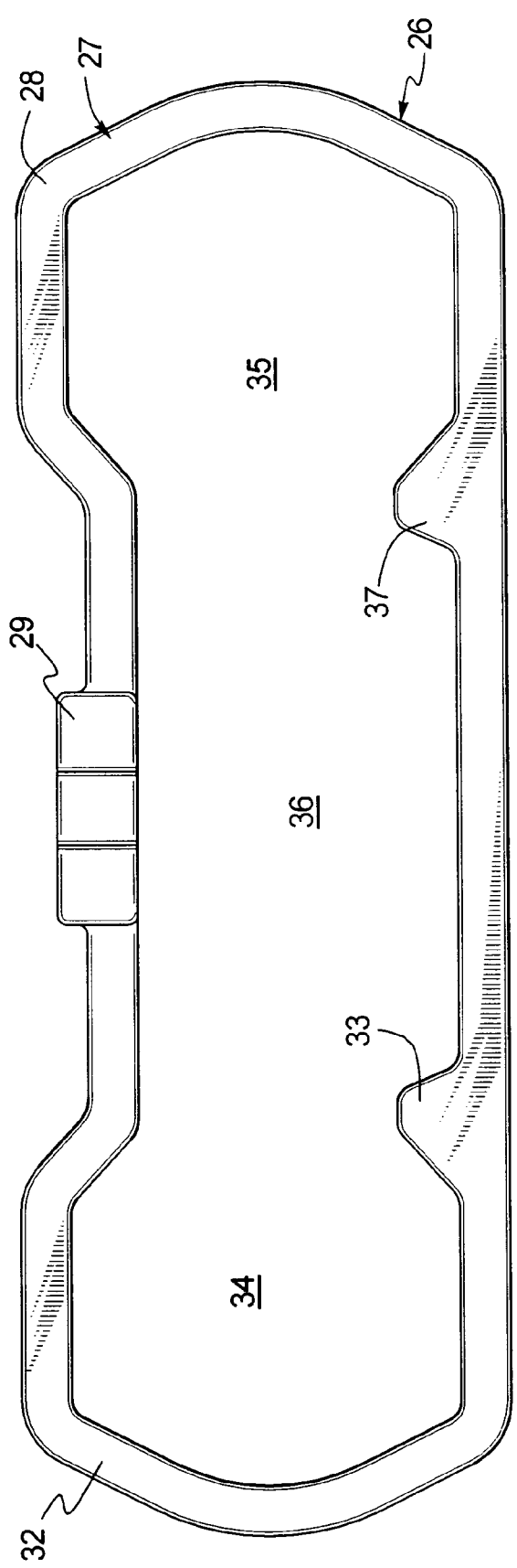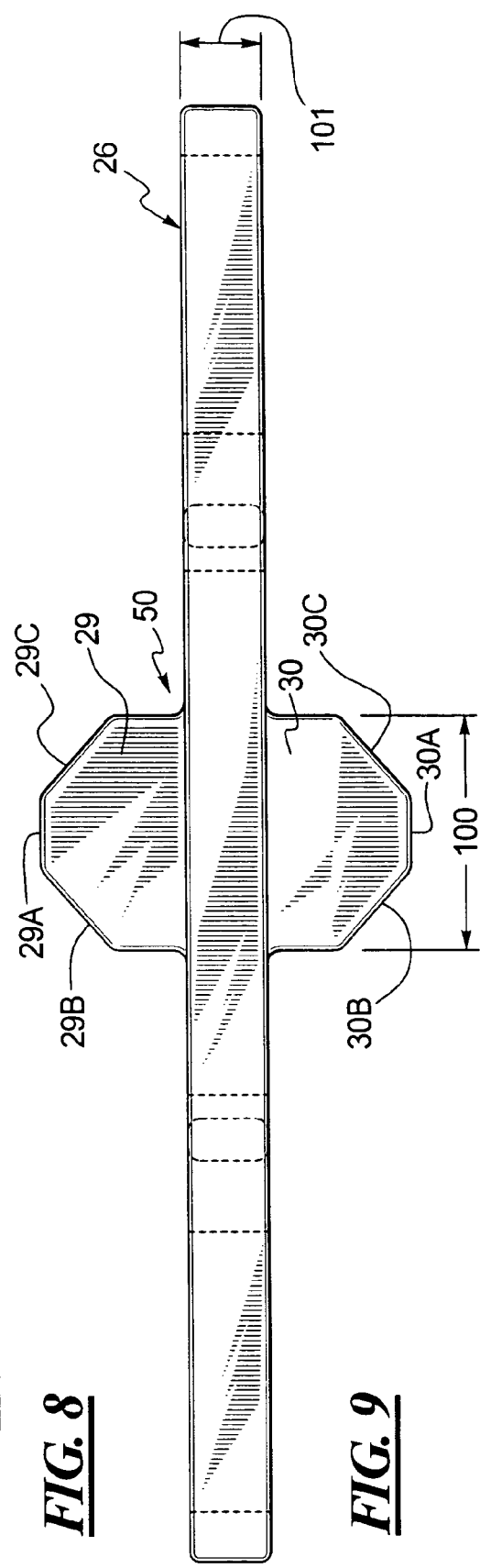
FIG. 8
FIG. 9

CONTAINER BRIDGING STABILIZER

BACKGROUND OF THE INVENTION

Freight shipping containers are well known, and are available, for example, in lengths such as 20', 40', and 48'. Rail cars known as "well" cars have a bottom well which receives either a single long container or two short containers, such as 20' containers arranged end-to-end.

It is also known to provide on top of two end-to-end 20 foot containers in a well car a 40' or 48' foot container stacked on top, which is linked to the two lower level 20' containers by what are known as semi-automatic inter-box connectors. A number of companies manufacture such semi-automatic inter-box connectors, including Martec, International of South Plainfield, N.J. When such a single long container is provided on top of the two 20' containers, stability is achieved since the upper container straddles, and is connected to, both of the lower 20' containers.

For connecting the upper container to the two lower containers, it is known to provide top and bottom corner castings at, or near, the upper and lower four corners of the containers. These castings provide a locking surface containing an oval cutout. The semi-automatic inter-box connectors are arranged between the top and bottom container corner castings and have rotatable locking elements received in the respective oval holes of the top and bottom corner castings, so as to lock the containers together in a vertical configuration.

When two 20' containers are placed in the well car at the bottom level, although it would be desirable to place a 40' or 48' container at the top level, such a container may not be readily available at the loading site. Although it would be desirable to place two additional 20' containers at a top level and stacked on top of the two lower level 20' containers, even with the use of the semi-automatic inter-box connectors, lateral stability of the respective stacks would be a major problem which would preclude such an arrangement.

SUMMARY OF THE INVENTION

It is an object of the invention to provide sufficient stability to allow two smaller-sized containers to be stacked on top of two similar smaller-sized lower containers.

According to the invention, a system and method are provided for stabilizing a first stack of upper and lower shipping containers with respect to a second stack of upper and lower shipping containers. Respective inter-box connectors are provided for connecting the upper and lower containers of each stack. At least one container bridging stabilizer is placed around two adjacent inter-box connectors to laterally link them and their respective lower containers together.

BRIEF DESCRIPTION OF THE DRAWINGS

FIG. 1 is a side view showing four similar relatively short containers stacked on a rail well car, and employing both semi-automatic inter-box connectors and bridging stabilizers to provide overall stability to the stacked arrangement;

FIG. 2 is a top view taken along section line II—II of FIG. 1;

FIG. 3 is a fragmentary top view of adjacent top corner castings of two adjacent end-to-end lower shipping containers prior to introduction of semi-automatic inter-box connectors;

FIG. 4 is a side view of a central junction location for four adjacent containers as shown in FIG. 1 showing the respective adjacent upper and lower corner castings in fragmentary view, but without the presence of the semi-automatic inter-box connectors and corresponding bridging stabilizers for clarity;

FIG. 6 is a side view of two inter-box connectors mounted in four respective corner castings of four respective containers and wherein a container bridging stabilizer surrounds the two inter-box connectors;

FIG. 7 is a top view of the arrangement shown in FIG. 6;

FIG. 8 is a plan view of the container bridging stabilizer;

FIG. 9 is a side view of the container bridging stabilizer;

DESCRIPTION OF THE PREFERRED EMBODIMENT

Figure 5:
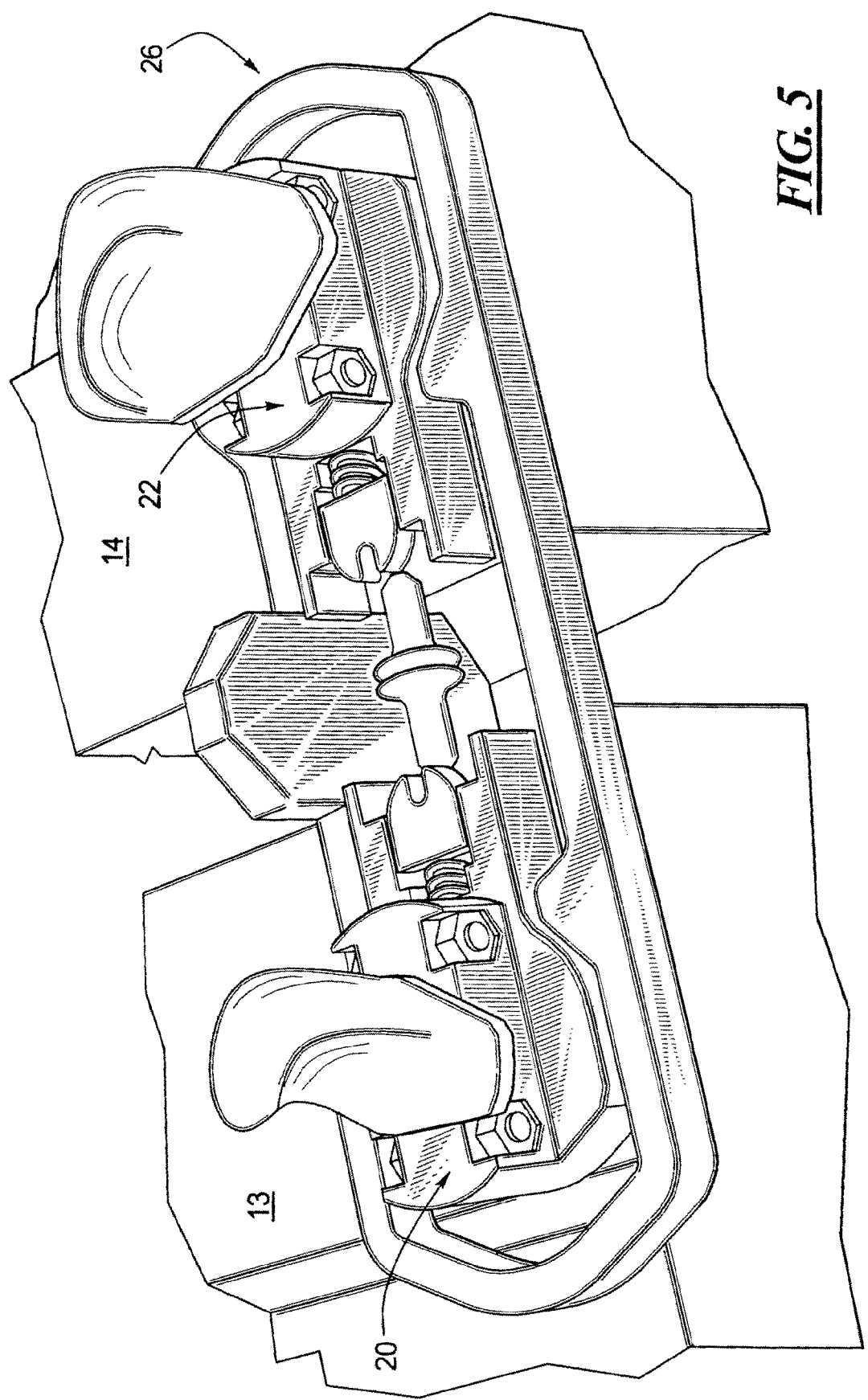
FIG. 5 is a perspective view of two inter-box connectors surrounded and linked by a respective container bridging stabilizer at adjacent corners of two lower-level end-to-end containers prior to stacking of two additional similarly sized containers at a top level.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

As shown in FIG. 1, an arrangement 10 of four containers are provided in a well car 11 having a well 12 for receiving two bottom containers 13, 14. Two top containers 15 and 16 at an upper level are stacked on top of the respective lower containers 13 and 14. The containers may all be similarly sizes, such as 20' containers, for example.

In FIG. 2, a plan view along section line II—II illustrates a location of semi-automatic inter-box connectors 17, 18, 19, 20, 21, 22, 23, and 24 joining the respective containers 13 and 15, and 14 and 16, together. Additionally, container bridging stabilizers 25 and 26 comprising stabilizing frames are provided surrounding the respective inter-box connectors 19, 21 and 20, 22.

As shown in FIG. 3, a fragmentary view is illustrated from the top of an upper corner casting 13A of container 13 and an upper corner casting 14A of container 14. These corner castings have respective oval locking apertures or holes 13B and 14B in a locking plate or surface 13C, 14C.

As shown in FIG. 4, when viewed from the side at the middle of the container arrangement shown at 10 in FIG. 1, the four respective corner castings 13A, 14A, 15A, and 16A of the respective containers 13, 14, 15 and 16 are positioned adjacent each other. Side ovals 133B, 144B, 155B, and 166B are provided in corner casting side surfaces 133D, 144D, 155D, 166D. The inter-box connectors are not shown in this view for clarity. It can also be seen how the oval locking holes 13B, 14B, 15B, and 16B are positioned oppositely facing each other.

In the perspective view of FIG. 5, two semi-automatic inter-box connectors, for example of the Martec International of South Plainfield, N.J., are provided as shown at 20 and 22. These inter-box connectors are locked into respective corner castings 13A, 14A of containers 13, 14. The two inter-box connectors are surrounded by the respective container bridging stabilizer 26. As may be appreciated, the inter-box connectors attach the containers stacked above one another and the container bridging stabilizer connects and stabilizes the two adjacent stacks formed of respective containers 13,15 and 14,16 with respect to each other.

With reference to FIG. 6, details of the inter-box connectors and respective container bridging stabilizer may be seen.

The prior art inter-box connector 20 is formed of a centrally located inter-box connector body 20A having a lower rotatable locking element 20B and an upper rotating locking element 20C which are actuated by locking pull cord 20D. These fit in the respective corner casting ovals, and are rotated to lock to the locking corner casting locking surface 15C or 13C, as the case may be.

The inter-box connector body 20A has separating flanges 20E and 20F, so that the top shipping container rests on the flanges and is thus spaced from the bottom shipping container. Separating flanges 20E, 20F (also see FIG. 7) have positioned therebetween a raised portion 20G of the inter-box connector body 20A.

The container bridging stabilizer 26 surrounds and links the two inter-box connectors 20, 22 as shown in FIGS. 6 and 7.

Details of the container bridging stabilizer are also clearly shown in the plan view of FIG. 8 and the side view of FIG. 9. The container bridging stabilizer 26 has a stabilizing frame 27 with end interlocking surface 32, 28 which cooperate with locking protrusions 33, 37 to position the respective inter-box connectors 20, 22 at respective locking regions 34, 35. A central access opening 36 is provided where the respective handles of the two inter-box connectors are situated.

Figure 10:
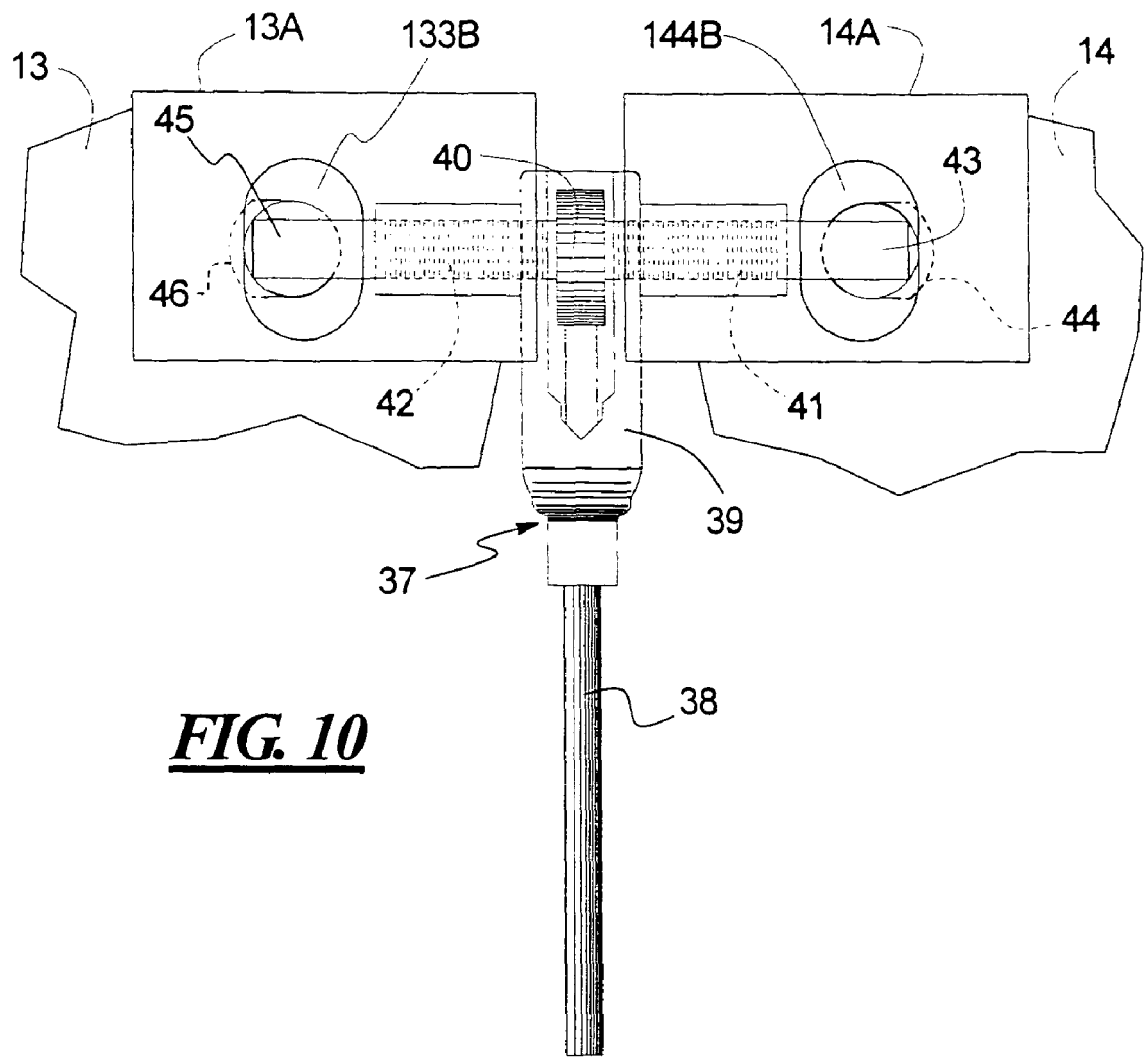
FIG. 10 is a side view showing a container spreader tool for positioning the containers prior to introduction of inter-box connectors and a respective container bridging stabilizer.
Figure 11:
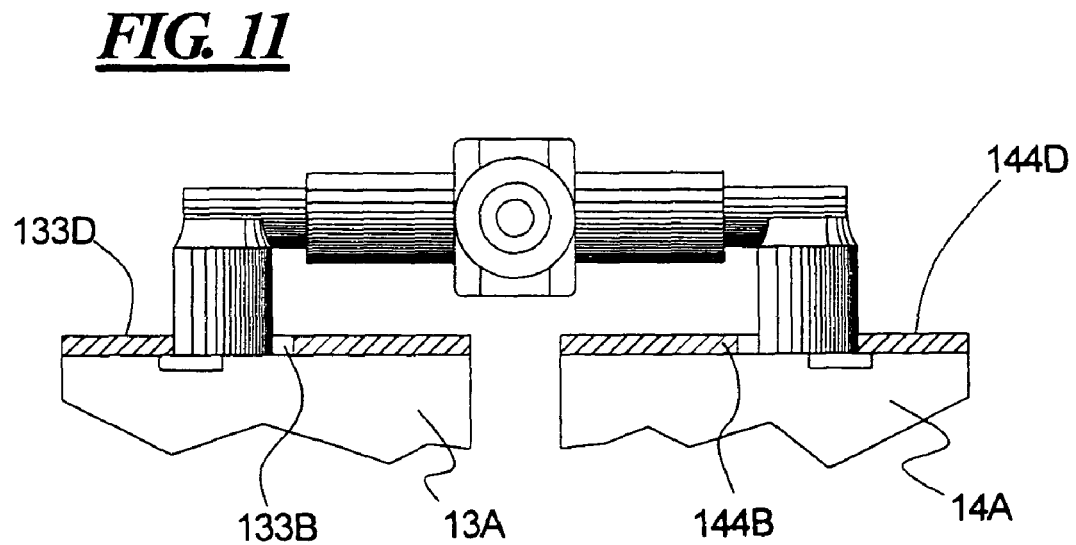
FIG. 11 is a bottom view looking up at the container spreader tool shown in FIG. 10.

A top container spacer 29 and a bottom container spacer 30 are provided as shown most clearly in FIG. 9. These have a width 100 corresponding to the container spacing. This container spacing is set by a container spreader tool described hereafter as shown in FIGS. 10 and 11. The container spacing not only insures access to the inter-box connector operating handles, but also allows placement of the container bridging stabilizer around the correctly spaced inter-box connectors.

The thickness 101 of the stabilizing frame 27 is equal to or somewhat less than a thickness of the separating flanges 20D, 20E of the inter-box connectors. Thus the container bridging stabilizer will then fit between the adjacent top and bottom containers.

The top and bottom container spacers 29 and 30 have respective flat surfaces 29A, 30A and beveled side portions 29B, 29C, 30B and 30C.

As shown in FIG. 10, to ensure proper spacing of the containers prior to insertion of the inter-box connectors and corresponding bridging stabilizer, a container spreader tool 37 is provided having an operating handle 38 connected by a ratchet housing 39 containing a ratchet 40 which drives respective adjusting screws 41, 42 connected to respective engagement members 43 and 45 having respective engagement lips 44 and 46. These are received in the side ovals 133B, 144B of the corner castings as illustrated. By moving the handle 38, the ratchet mechanism decreases or increases the spacing between the engagement members 43 and 45.

FIG. 11 shows the bottom view looking up at the container spreader tool being received in the ovals 133B, 144B in the respective side surfaces 133D, 144D of the corner castings 13A, 14A.

Of course, in addition to use on rail well cars, the container bridging stabilizer may be used for stacking containers on other types of transport units such as trucks, ships or other transportation vehicles.

Although a particular type of inter-box connector from the prior art has been shown, the container bridging stabilizer may be used with other types of inter-box connectors and other types of containers having locking apertures of various shapes and sizes with different types of corner attachment apertures or mechanisms. Furthermore, the particular shape of the container bridging stabilizer may be varied to accommodate different types of inter-box connectors, different types of containers, and different types of corner attachment systems.

Although it is preferred to make the container bridging stabilizer of steel, other types of materials may also be employed.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

I claim:

1. A method for stabilizing a first stack of upper and lower shipping containers with respect to an adjacent second stack of upper and lower shipping containers, comprising the steps of:

connecting a plurality of inter-box connectors to each lower container;

placing at least one container bridging stabilizer having a single inter-box connector receiving aperture only around two adjacent ones of said inter-box connectors when the lower containers are laterally adjacent each other to laterally link the two adjacent inter-box connectors and their respective adjacent lower containers together, both of said adjacent inter-box connectors being positioned in said single inter-box connector receiving aperture; and lowering the respective upper containers onto the respective lower containers and locking the respective upper and lower containers vertically together with the inter-box connectors.

2. A method for stabilizing a first stack of upper and lower shipping containers with respect to an adjacent second stack of upper and lower shipping containers, comprising the steps of:

connecting a plurality of inter-box connectors to each lower container;

placing at least one container bridging stabilizer around two adjacent ones of said inter-box connectors when the lower containers are laterally adjacent each other to laterally link the two adjacent inter-box connectors and their respective adjacent lower containers together;

lowering the respective upper containers onto the respective lower containers and locking the respective upper and lower containers vertically together with the inter-box connectors; and each of the inter-box connectors having rotatable upper and lower locking elements and wherein the inter-box connectors are connected to the lower containers by at least one of pulling out a cord and manually rotating the lower locking element of the connectors to fit the lower locking element to a respective corner locking aperture of the lower containers when the respective upper container is lowered onto the respective lower container, the respective upper locking element automatically rotating as a respective corner locking aperture of the respective upper container interacts with the respective upper locking element.

3. The method of claim 1 comprising the step of providing two of said container bridging stabilizers, and placing each of the respective container bridging stabilizers around two respective adjacent ones of said inter-box connectors to laterally link them together at laterally spaced apart locations along an upper edge at a top of each of the lower containers.

4. The method of claim 1 including the step of placing the lower shipping containers in a well of a rail car adjacent each other laterally in an end-to-end configuration.

5. The method according to claim 1 including the step of providing said upper and lower shipping containers as approximately 20' long containers.

6. A method for stabilizing a first stack of upper and lower shipping containers with respect to an adjacent second stack of upper and lower shipping containers, comprising the steps of:
   connecting a plurality of inter-box connectors to each lower container;
   placing at least one container bridging stabilizer around two adjacent ones of said inter-box connectors when the lower containers are laterally adjacent each other to laterally link the two adjacent inter-box connectors and their respective adjacent lower containers together;
   lowering the respective upper containers onto the respective lower containers and locking the respective upper and lower containers vertically together with the inter-box connectors; and
   placing the lower containers laterally adjacent each other on a surface on which they are to be shipped, and with a container spreader tool, adjusting a lateral spacing between the adjacent lower shipping containers so that the bridging stabilizer will fit around the two adjacent inter-box connectors.

7. The method according to claim 6 including the step of providing the container spreader tool with a ratchet housing and a handle and wherein operation of the handle drives respective adjusting screws connected to respective engagement members received in ovals at a side of said laterally adjacent lower containers.

8. A method for stabilizing a first stack of upper and lower shipping containers with respect to an adjacent second stack of upper and lower shipping containers, comprising the steps of:
   providing a plurality of connectors for connecting the upper and lower containers of each stack:
   providing a bridging stabilizer with two container spacers, one of said spacers being an upper container spacer projecting up from said bridging stabilizer and the other one of said spacers being a lower container spacer projecting down from said bridging stabilizer;
   connecting the plurality of connectors to the lower containers;
   placing the bridging stabilizer at two adjacent ones of said plurality of connectors when the lower containers are laterally adjacent each other to laterally link said two adjacent ones of said plurality of connectors; and
   lowering the respective upper container of the first stack onto the lower container of the first stack and lowering the upper container of the second stack onto the lower container of the second stack, and locking the upper and lower containers of the first and second stacks vertically together with the plurality of connectors, and wherein the upper container spacer is located in a gap between the upper shipping containers and the lower container spacer is located in a gap between the lower shipping containers.

9. A method of claim 8 wherein the bridging stabilizer has a single connector receiving aperture only and the two adjacent connectors are both located within said single connector receiving aperture.

10. A method of claim 9 wherein said single connector receiving aperture has two projections, with each projection defining a respective region for receiving a respective one of said two adjacent connectors.

\* \* \* \* \*